United States Patent
Weis et al.

(10) Patent No.: US 12,516,719 B2
(45) Date of Patent: Jan. 6, 2026

(54) SET OF COMPONENTS FOR THE ASSEMBLY OF TRUE-PITCH ROLLING-CONTACT PLANETARY TRANSMISSIONS

(71) Applicant: Schaeffler Technologies AG & Co. KG, Herzogenaurach (DE)

(72) Inventors: Sebastian Weis, Brücken (DE); Waldemar Heier, Homburg (DE); Patrick Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 65 days.

(21) Appl. No.: 18/684,877

(22) PCT Filed: Jul. 26, 2022

(86) PCT No.: PCT/DE2022/100538
§ 371 (c)(1),
(2) Date: Feb. 20, 2024

(87) PCT Pub. No.: WO2023/025343
PCT Pub. Date: Mar. 2, 2023

(65) Prior Publication Data
US 2025/0129836 A1 Apr. 24, 2025

(30) Foreign Application Priority Data

Aug. 23, 2021 (DE) ..................... 10 2021 121 736.9

(51) Int. Cl.
*F16H 25/20* (2006.01)
*F16H 25/22* (2006.01)
*F16H 25/24* (2006.01)

(52) U.S. Cl.
CPC ......... *F16H 25/2252* (2013.01); *F16H 25/24* (2013.01); *F16H 2025/2481* (2013.01)

(58) Field of Classification Search
CPC ... F16H 25/2252; F16H 25/24; F16H 25/2481
See application file for complete search history.

(56) References Cited

U.S. PATENT DOCUMENTS

2013/0143712 A1* 6/2013 Osterlanger ........ F16H 25/2252
475/333

FOREIGN PATENT DOCUMENTS

| DE | 1750637 A1 | 4/1971 | |
|---|---|---|---|
| DE | 102007015985 A1 | 10/2008 | |
| DE | 102010022893 A1 | 12/2011 | |
| DE | 102011075950 A1 * | 11/2012 | ......... F16H 25/2252 |
| DE | 102013209293 A1 | 11/2014 | |
| DE | 102015209598 A1 * | 12/2016 | ......... F16H 25/2252 |

(Continued)

*Primary Examiner* — Zakaria Elahmadi

(57) ABSTRACT

A set of components for the assembly of true-pitch rolling-contact planetary transmissions, in particular for electromechanical actuators of rear axle steering systems, comprises at least one threaded spindle, a number of planet rollers which can be placed onto the threaded spindle, at least one cage designed for guiding the planet wheels and provided as a drive element, and a plurality of different spindle nuts provided for receiving the planet wheels. The spindle nuts differ from one another in terms of the play that the planet rollers located between the threaded spindle and the spindle nut have.

17 Claims, 2 Drawing Sheets

(56) References Cited

FOREIGN PATENT DOCUMENTS

| | | | |
|---|---|---|---|
| DE | 102017124386 A1 | | 1/2019 |
| DE | 102018130612 A1 | | 6/2020 |
| DE | 102019109166 A1 | * | 6/2020 ......... F16H 25/2252 |
| DE | 102019103384 A1 | | 8/2020 |
| DE | 102019110980 A1 | | 10/2020 |
| DE | 102019119339 A1 | | 1/2021 |
| DE | 102019127865 A1 | | 4/2021 |
| DE | 102020103422 A1 | | 8/2021 |
| EP | 0603067 B1 | | 3/1997 |
| WO | 2019007457 A1 | | 1/2019 |
| WO | 2020164653 A1 | | 8/2020 |

* cited by examiner

SET OF COMPONENTS FOR THE ASSEMBLY OF TRUE-PITCH ROLLING-CONTACT PLANETARY TRANSMISSIONS

CROSS-REFERENCE TO RELATED APPLICATIONS

This application is the U.S. National Phase of PCT Application No. PCT/DE2022/100538 filed on Jul. 26, 2022, which claims priority to DE 10 2021 121 736.9 filed on Aug. 23, 2021, the entire disclosures of which are incorporated by reference herein.

TECHNICAL FIELD

The disclosure relates to a set, i.e. a kit, of various components which are suitable for the assembly of true-lead rolling-contact planetary transmissions.

BACKGROUND

A rolling-contact planetary transmission is known from DE 10 2007 015 985 A1, which is generally referred to therein as a device for converting a rotational movement into an axial movement. Components of the known rolling-contact planetary transmission are a threaded spindle with a predetermined number of gears, a number of planet rollers, i.e., rolling elements, and a nut with an internal profile. According to DE 10 2007 015 985 A1, threaded spindles with a different number of gears can be combined with the same types of rolling elements. This provides a kit that is suitable for manufacturing rolling-contact planetary transmissions with different transmission ratios.

EP 0 603 067 B1 discloses a rolling-contact planetary transmission, which in that case is referred to as a roller-screw-mechanism. The rollers, i.e., planet rollers, of the roller-screw-mechanism are guided by means of a guide cage and contact two annular half nuts, which are arranged in a preload housing, so that a preload is provided between the half nuts, which have the overall function of a spindle nut, and the planet rollers.

Further possibilities for bracing the nut parts of a rolling-contact planetary transmission against one another and against the planet rollers are described in WO 2019/007457 A1. In contrast to the solutions proposed in WO 2019/007457 A1, in the case of a rolling-contact planetary transmission disclosed in DE 10 2019 127 865 A1, two nut parts are secured against mutual rotation by a not non-destructively detachable connection.

Different variants of true-lead rolling-contact planetary transmissions, sometimes also referred to as synchronized planetary screw drives, are described in the documents WO 2020/164653 A1, DE 10 2019 103 384 A1 and DE 10 2019 109 166 A1. In a true-lead planetary screw drive, it is not the nut or spindle of the screw drive that is driven, but a cage in which the planet rollers of the screw drive are guided. Compared to a planetary screw drive, in which either the threaded spindle or the associated nut is used as the drive element, this provides the advantage that there is a clear relationship between the angular position of the driving element and the feed of the output element. In this respect, a true-lead planetary screw drive (SPWG) has the same properties as a simple movement thread. In terms of friction, a true-lead planetary screw drive is generally superior to a simple movement thread. Extreme transmission ratios, which can otherwise be achieved with a planetary screw drive, cannot be achieved with a true-lead planetary screw drive.

DE 10 2019 110 980 A1 describes a method for assembling a rolling-contact planetary transmission. As part of this method, planet rollers are inserted into a spindle nut with filling openings.

Details of a cage guiding several planet rollers in a rolling-contact planetary transmission are described, for example, in DE 10 2019 109 166 A1. The cage of this rolling-contact planetary transmission comprises several annular cage elements that are secured within a spindle nut.

With regard to possible measuring systems on an actuator comprising a planetary screw drive, reference is made to DE 10 2019 119 339 A1 as an example. In this case, two measuring systems are provided that interact with one another.

A planetary screw drive for a rear axle steering system of a vehicle is known, for example, from DE 10 2018 130 612 A1. This document deals in detail with an axial bearing with which a nut of the planetary screw drive is mounted relative to a housing.

SUMMARY

The disclosure is based on the object of streamlining the manufacture of rolling-contact planetary transmissions for various applications compared to the aforementioned prior art, wherein the aim is to achieve the most compact, robust design possible for the end products, i.e., the rolling-contact planetary transmissions.

This object is achieved according to the disclosure by a set of components suitable for manufacturing true-lead rolling-contact planetary transmissions according to that which is described herein. The set of components comprises at least one threaded spindle, a number of planet rollers which can be placed onto the threaded spindle, at least one cage designed for guiding the planet rollers and provided as a drive element, and a plurality of different spindle nuts provided for receiving the planet rollers. The spindle nuts differ from one another in terms of the play that the planet rollers located between the threaded spindle and the spindle nut have.

The disclosure is based on the consideration that, depending on the intended application, different ideal states can exist for rolling-contact planetary transmissions with regard to the play existing in the rolling-contact planetary transmission (PWG). While a high preload between the spindle nut and planet rollers may be advantageous in a first application, a lower preload or even play between the planet rollers and the threaded spindle in the mechanically unloaded state may be advantageous in another application.

Such differing requirements are taken into account by the set of components described herein with a minimized number of different component variants. Only the spindle nuts are present in different variants, whereas planet rollers and threaded spindles can be used in a standardized form.

When mounting the planetary screw drive, there is no need to adjust the preload between individual nut parts. Instead, only the suitable spindle nut must be selected. The low number of parts in the planetary screw drive also has the advantage of particularly short tolerance chains. Thanks to the undivided spindle nut, the rolling-contact planetary transmission has a simple and robust design.

In addition, the one-piece design of the spindle nut ensures a high degree of rigidity, wherein the rigidity can be influenced as required by defined notches on the inner and/or outer diameter of the spindle nut. Instead of notches, other types of material weakening can also be provided, which are located in the central section of the spindle nut, i.e., between the sections in which the spindle nut contacts the planet rollers. This material weakening, in particular in the form of one or more circumferential slots on the inner diameter and/or outer diameter of the spindle nut, provides it with a significant, albeit slight, elastic resilience in the axial direction.

The set of components intended for the manufacture of rolling-contact planetary transmissions comprises, for example, three or more different variants of spindle nuts to adjust a play of the planet rollers. Here, a first variant of the spindle nut can be designed to produce contacts with play between the spindle nut and the planet rollers. Variants of the spindle nut can also be provided which are suitable for producing preloaded contacts between the spindle nut and the planet rollers. Finally, it is possible to match the spindle nuts to the geometry of the other components of the rolling-contact planetary transmission, in particular the threaded spindle and the planet rollers, in such a way that a transitional play exists between the spindle nut and the planet rollers. The term "transitional play" is understood to mean the range at the boundary between play and preload.

All variants of the spindle nut can have a no-lead profile with a uniform pitch. This means that there is a constant pitch, i.e., a uniform distance between the grooves formed by the profile, within one and the same spindle nut, and that all variants of the spindle nut have the same pitch.

In one possible design of such a no-lead profiled spindle nut, two outer profiled sections of the spindle nut are spaced apart from one another, wherein the smallest distance, which exists between a groove of the profile of the first outer section of the spindle nut and a groove of the profile of the second outer section of the spindle nut, is different depending on the variant of the spindle nut. In simple terms, this means that the two outer profiled sections of the spindle nut are at different distances from one another depending on the variant, wherein the outer dimensions of the spindle nut can be identical in all variants. Here, the difference between the largest distance present in a first variant of the spindle nut, which is to be measured in the manner described, and the smallest distance to be determined in the same manner, which is present in another variant of the spindle nut, corresponds, for example, to at least 5% and at most 30% of the pitch of the profile of the spindle nut.

The differences between the different variants of spindle nuts, which are reflected in different distances between the grooves of the two outer profiled sections of the respective spindle nut that are furthest inwards when viewed in the axial direction, entail central, typically unprofiled, sections of the one-piece spindle nut with different widths. According to a possible variant of the set of PWG components, all variants of spindle nuts contained in the set have a material weakening in their central section in the form of an annular slot on the outer circumferential surface of the respective spindle nut, which ensures a defined elasticity.

The one-piece spindle nut of the rolling-contact planetary transmission, which is available in different variants, is used to transmit forces, in particular axial forces, but is neither a drive nor an output element of the rolling-contact planetary transmission. Rolling bearings can be provided to mount the spindle nut in the cage. Rolling bearings can also be provided to mount the cage surrounding the spindle nut in a surrounding structure. In both cases, roller bearings, in particular angular contact roller bearings or angular contact needle roller bearings, can be considered as rolling bearings, wherein the rolling elements, i.e., rollers, can either roll on separate bearing rings or directly on the relevant components of the rolling-contact planetary transmission, i.e., on surfaces of the spindle nut or the cage.

BRIEF DESCRIPTION OF THE DRAWINGS

In the following, an exemplary embodiment of the disclosure is explained in more detail with reference to a drawing. In the figures.

DETAILED DESCRIPTION

A rolling-contact planetary transmission designated with the reference symbol 1 is designed as a true-lead planetary screw drive (SPWG). With regard to the basic function of such a screw drive designed as an SPWG, reference is made to the prior art cited at the outset.

Figure 1:
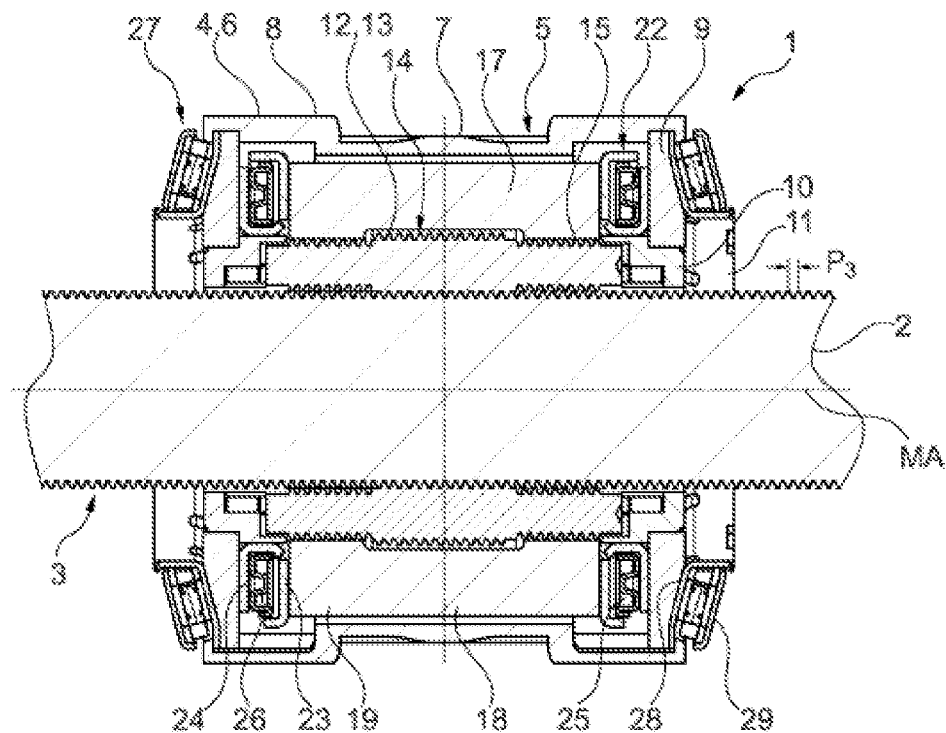
FIG. 1 shows a sectional view of a rolling-contact planetary transmission.

The rolling-contact planetary transmission 1 comprises a threaded spindle 2 with a thread 3, which in the present case is a single-start thread. Deviating from this, variants of the rolling-contact planetary transmission 1 (not shown) with a multi-start spindle, in particular a double- or triple-start spindle, can also be realized. The central axis of the threaded spindle 2 and thus of the entire rolling-contact planetary transmission 1 is designated with MA. The threaded spindle 2 is concentrically surrounded by a housing 4 that can be rotated as a whole and acts as the drive element of the rolling-contact planetary transmission 1. An external toothing 5 of the housing 4 enables it to be driven by a traction means not shown in FIG. 1. Alternatively, a separate drive element, for example a gear wheel or chain wheel, could be connected to the housing 4.

Figure 2:
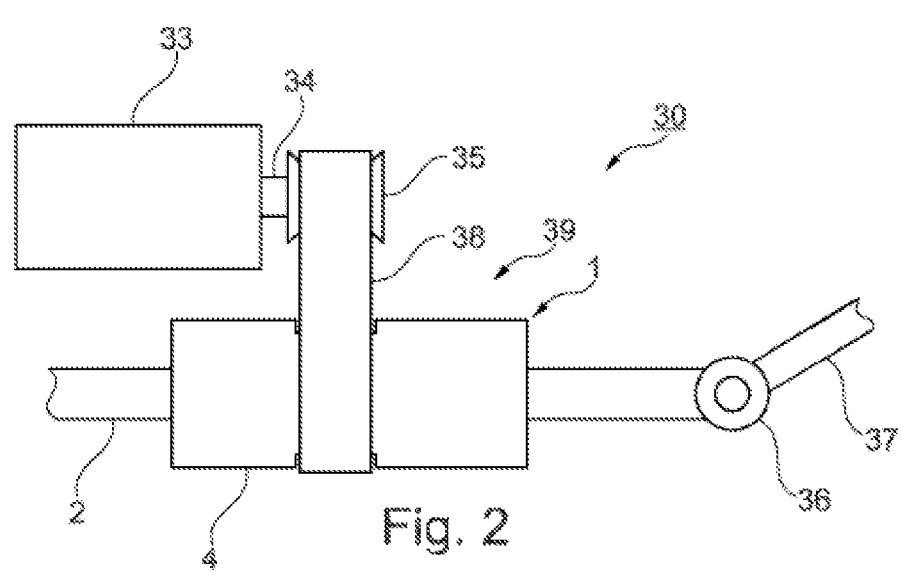
FIG. 2 shows a schematic representation of an electromechanical actuator comprising the rolling-contact planetary transmission, namely a linear actuator of a rear axle steering system of a motor vehicle.

In the constellation shown in FIG. 2, which shows the basic structure of an electromechanical chassis actuator 30, the traction means via which the rolling-contact planetary transmission 1 can be actuated is a toothed belt 38, which can be associated with a belt drive 39 designed as a reduction gear. To drive the belt drive 39, an electric motor 33 is provided, whose motor shaft parallel to the central axis MA is designated with 34 and is firmly connected to a belt pulley 35, via which the toothed belt 38 runs. Means for mounting the rotatable housing 4 in a surrounding structure are not shown in FIG. 2. The threaded spindle 2 is coupled to a further chassis element 37 via a hinge 36. The actuator 30 is part of a rear axle steering system of a motor vehicle. Similarly, the electromechanical actuator 30 is suitable for use in a front axle steering system of a vehicle.

The housing 4, which is rotatably mounted in the actuator 30 and the external toothing 5 of which is located in a constricted housing region 7, is associated with a cage 6 of the rolling-contact planetary transmission 1. The cage 6 further comprises two driving flanges 9, each of which is connected in a non-rotatable manner to a cylindrical housing section 8 without toothing. The driving flanges 9 are in turn connected to planetary spacers 10, which are also annular in shape. Furthermore, the cage 6 is associated with two discs 11 on its end faces.

A plurality of planet rollers 12 are guided in the cage 6. The planet rollers 12 have a profiled and stepped shape. Here, the largest diameter of each planet roller 12 is present in the region of its central section designated with 13. A profile of the central section 13 of the planet roller 12, designated with 14, has a pitch $P_{14}$ which corresponds to the lead of the thread 3, designated with $P_3$. In contrast to the thread 3 of the spindle 2, the profile 14 is designed to be without lead. The planet rollers 12 contact the threaded spindle 2 exclusively with their central sections 13.

The central section 13 is adjoined on both sides by outer sections 15 of the planet roller 12, which have an outer profile 16. Corresponding to the profile 14 in the central section 13, the outer profile 16 is also designed in the form of no-lead grooves. The pitch of the outer profile 16 is designated with $P_{16}$ and does not necessarily correspond to the pitch $P_{14}$, which is present in the central section 13 of the planet roller 12.

The outer profiles 16 of the planet roller 12 mesh with a profile 20 of a spindle nut 17, 31, 32. The pitch of the profile 20 of the spindle nut 17, 31, 32 is designated with $P_{20}$ and corresponds to the pitch $P_{16}$ of the outer profiles 16 of the planet roller 12. Grooves formed by the profile 20 on the inner circumferential surface of the spindle nut 17, 31, 32 are designated with 21. The profile 20 is formed on outer profiled sections 19 of the spindle nut 17, 31, 32. A central unprofiled section 18 of the spindle nut 17, 31, 32 is located axially between the outer sections 19. In the central section 18 there is no contact between the spindle nut 17, 31, 32 and the planet roller 12. On the outer circumferential surface of the central section 18 there is an annular slot 40, which can be seen in FIGS. 3 to 5 and which is generally referred to as a material weakening and ensures a defined elasticity of the spindle nut 17, 31, 32 in its axial direction.

The spindle nut 17, 31, 32 is mounted in the cage 6 by means of two inner rolling bearings 22, in the present case two thrust roller bearings. The inner rolling bearings 22 each have a nut-side bearing ring 23 and a cage-side bearing ring 24. Rolling elements 25, i.e., rollers, of the inner rolling bearing 22 are guided in a cage 26. In a modified embodiment not shown, the rolling elements 25 could also roll directly on surfaces of the spindle nut 17, 31, 32 and/or the cage 6, in particular the driving flange 9, instead of on the bearing rings 23, 24. In any case, the rolling bearings 22 are arranged within the cage 6.

On the outside of the cage 6 there are two outer rolling bearings 27, which in this case are designed as angular contact roller bearings. The outer rolling bearings 27 have cage-side bearing rings 28, which in the present case each contact a driving flange 9 and at the same time a disc 11, as well as outer bearing rings 29, which contact a surrounding component (not shown), i.e., the actuator housing.

Figure 3:
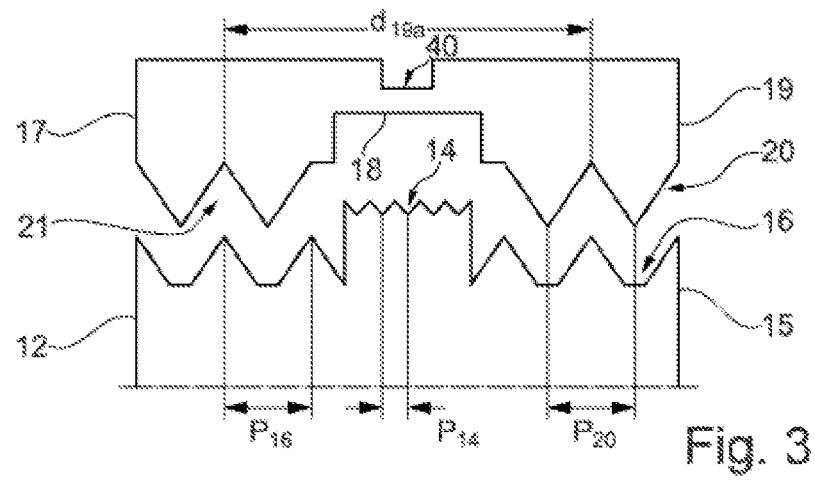
FIGS. 3 to 5 show possible planet roller and spindle nut combinations that can be used in the rolling-contact planetary transmission.
Figure 4:
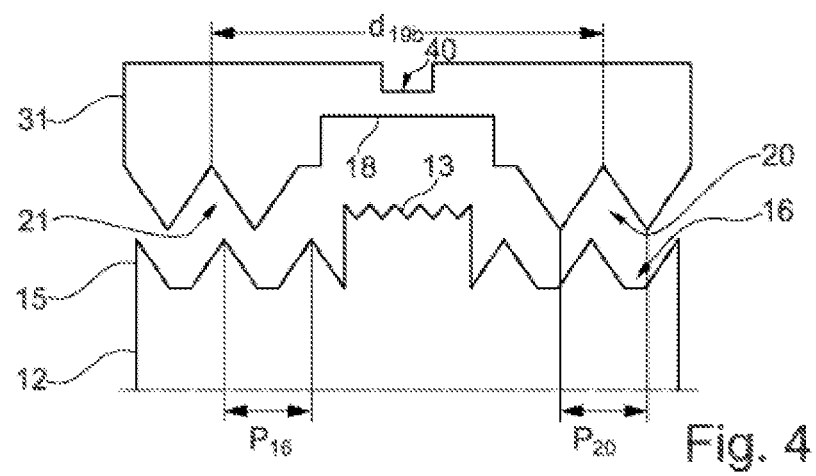
Figure 5:
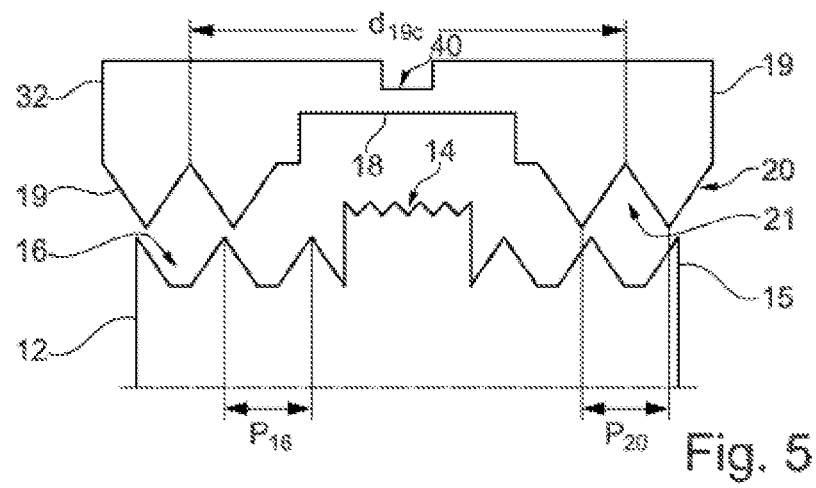

The planet roller and spindle nut combinations sketched in FIGS. 3 to 5 differ from each other only with regard to the spindle nut 17, 31, 32. The spindle nut 17 according to FIG. 3 enables the planet rollers 12 to be arranged with play in the spindle nut 17. The distance between the two grooves 21 of the outer sections 19 that are furthest inwards, i.e. the least distant from the central section 18, is designated with $d_{19a}$.

In the variant shown in FIG. 5, this distance to be measured between the furthest inward grooves 21 of the two outer sections 19 is maximum and is designated with $d_{19c}$. The increased distance $d_{19c}$ of the spindle nut 32 according to FIG. 5 compared to the spindle nut 17 according to FIG. 3 ensures that a preload is created when the planet rollers 12 are inserted into the spindle nut 32. Due to the shape of the profiles 16, 20, this preload presses the planet rollers 12 against the threaded spindle 2 in the radial direction, relative to the central axis MA.

In the constellation shown in FIG. 4, a spindle nut 31 is used in which the distance between the closest grooves 21 of the different outer sections 19 is designated with $d_{19b}$ and is between the distance $d_{19a}$ and the distance $d_{19c}$ in absolute terms. As far as the play of the planet rollers 12 is concerned, this provides a transitional range between the arrangement with play according to FIG. 3 and the preloaded arrangement according to FIG. 5. All planet roller and spindle nut combinations according to FIGS. 3 to 5 are suitable for selective use in the rolling-contact planetary transmission 1 according to FIG. 1.

LIST OF REFERENCE SYMBOLS

1 Rolling-contact planetary transmission
2 Threaded spindle
3 Thread
4 Housing
5 External toothing of the housing
6 Cage
7 Constricted region of the housing
8 Cylindrical housing section without toothing
9 Driving flange
10 Planetary spacer
11 Disc
12 Planet roller
13 Central section of the planet roller
14 Profile of the central section of the planet roller
15 Outer section of the planet roller
16 Outer profile of the planet roller
17 Spindle nut
18 Central unprofiled section of the spindle nut
19 Outer profiled section of the spindle nut
20 Profile of the spindle nut
21 Groove of the spindle nut
22 Inner rolling bearing
23 Nut-side bearing ring of the inner rolling bearing
24 Cage-side bearing ring of the inner rolling bearing
25 Rolling elements of the inner rolling bearing
26 Cage of the inner rolling bearing
27 Outer rolling bearing
28 Cage-side bearing ring of the outer rolling bearing
29 Outer bearing ring of the outer rolling bearing
30 Actuator
31 Modified spindle nut
32 Modified spindle nut
33 Electric motor
34 Motor shaft
35 Belt pulley
36 Hinge
37 Chassis element
38 Toothed belt
39 Belt drive
40 Material weakening, slot
$d_{19a}$ Distance between the grooves 21 of the two outer profiled sections 19 of the spindle nut that are furthest inwards, i.e., closest to the unprofiled section 18
$d_{19b}$, $d_{19c}$ Same as $d_{19a}$ but with modified spindle nut
MA Central axis
$P_3$ Lead of the threaded spindle
$P_{14}$ Pitch of the profile of the central section of the planet roller
$P_{15}$ Pitch of the profile of the outer section of the planet roller $P_{20}$ Pitch of the profile of the spindle nut

The invention claimed is:

1. A kit of components configured for an assembly of true-lead rolling-contact planetary transmissions, comprising:
   a threaded spindle,
   a plurality of planet rollers arranged onto the threaded spindle,
   at least one cage configured for guiding the planet rollers and as a drive element, and
   a plurality of selectable spindle nuts configured for receiving the plurality of planet rollers, each of the plurality of selectable spindle nuts defining a different play of the plurality of planet rollers, the plurality of planet rollers arranged between a selected one of the plurality of selectable spindle nuts and the threaded spindle,
   wherein:
      the plurality of selectable spindle nuts comprises at least three different variants of spindle nuts, and the at least three different variants of spindle nuts define at least three different plays of the planet rollers,
      a first one of the at least three different variants of spindle nuts is configured to produce contacts with play between the spindle nut and the plurality of planet rollers,
      a second one of the at least three different variants of spindle nuts is configured to produce preloaded contacts between the spindle nut and the plurality of planet rollers, and
      a third one of the at least three different variants of spindle nuts is configured to produce a transitional play between the spindle nut and the plurality of planet rollers.

2. The kit according to claim 1, wherein the at least three different variants of spindle nuts have a no-lead profile with a same uniform pitch, and two outer profiled sections of each one of the at least three different variants of spindle nuts are spaced apart from one another, and
   a smallest distance between a furthest inward groove of a first one of the two outer profiled sections and a furthest inward groove of a second one of the two outer profiled sections is different for each one of the at least three different variants of spindle nuts.

3. The kit according to claim 2, wherein the smallest distance amongst the at least three different variants of spindle nuts ranges between 5% and 30% of the same uniform pitch of the no-lead profile of the at least three different variants of spindle nuts.

4. The kit according to claim 3, wherein at least one of the at least three different variants of spindle nuts includes a circumferential slot arranged between the first one of the two outer profiled sections and the second one of the two outer profiled sections, the circumferential slot configured to impart elasticity in an axial direction of the spindle nut.

5. The kit according to claim 4, further comprising first rolling bearings configured for mounting one of the at least three different variants of spindle nuts in the at least one cage and second rolling bearings configured for mounting the at least one cage in a surrounding structure.

6. The kit according to claim 5, wherein at least one of the first rolling bearings or the second rolling bearings is configured as an angular contact roller bearing or angular contact needle roller bearing.

7. The kit according to claim 1, wherein each one of the plurality of selectable spindle nuts is constructed from one piece.

8. The kit according to claim 1, wherein the at least one cage is non-rotatably connected to a housing arranged radially outwardly of the selected one of the plurality of selectable spindle nuts, and the housing is configured to be rotatably driven via a belt.

9. A kit for a planetary screw drive assembly, comprising:
   a threaded spindle,
   a plurality of planet rollers configured to engage with the threaded spindle to convert rotational movement to axial movement, and
   a plurality of selectable spindle nuts, each of the plurality of selectable spindle nuts having a groove profile defined by a first groove and a second groove configured to engage the plurality of planet rollers, and a defined distance between the first groove and the second groove varies amongst the plurality of selectable spindle nuts so as to vary a play of the plurality of planet rollers within the planetary screw drive assembly,
   wherein a first nut of the plurality of selectable spindle nuts produces preloaded contacts between the first nut and the plurality of planet rollers, and a second nut of the plurality of selectable spindle nuts produces contacts with play between the second nut and the plurality of planet rollers.

10. The kit according to claim 9, wherein the plurality of selectable spindle nuts has a groove profile with a same uniform pitch.

11. The kit according to claim 9, wherein the first groove and the second groove are arranged on an inner circumferential surface of the plurality of selectable spindle nuts.

12. The kit according to claim 9, wherein each one of the plurality of selectable spindle nuts is constructed from one piece.

13. The kit according to claim 12, wherein the first groove and the second groove are separated from one another via an unprofiled section.

14. The kit according to claim 9, wherein the first groove is arranged on a first outer section and the second groove is arranged on a second outer section, and the first outer section is separated from the second outer section via an unprofiled section.

15. The kit according to claim 9, wherein only the plurality of selectable spindle nuts includes different variants.

16. A kit for a planetary screw drive assembly, comprising:
   a threaded spindle,
   a plurality of planet rollers arranged onto the threaded spindle,
   at least one cage configured for guiding the planet rollers and as a drive element, and
   a plurality of selectable spindle nuts configured for receiving the plurality of planet rollers, each of the plurality of selectable spindle nuts defining a different play of the plurality of planet rollers, the plurality of planet rollers arranged between a selected one of the plurality of selectable spindle nuts and the threaded spindle, and
   the plurality of selectable spindle nuts comprises at least three different variants of spindle nuts, and the at least three different variants of spindle nuts define at least three different plays of the planet rollers.

17. The kit according to claim 16, wherein the kit includes only one threaded spindle.

* * * * *